(12) United States Patent
Sann et al.

(10) Patent No.: US 9,393,508 B2
(45) Date of Patent: Jul. 19, 2016

(54) FILTER DEVICE

(71) Applicant: Hydac Filtertechnik GmbH, Sulzbach/Saar (DE)

(72) Inventors: Norbert Sann, Riegelsberg (DE); Dirk Röder, Saarbrücken (DE)

(73) Assignee: HYDAC FILTERCHNIK GMBH, Sulzbach/Saar (DE)

( * ) Notice: Subject to any disclaimer, the term of this patent is extended or adjusted under 35 U.S.C. 154(b) by 13 days.

(21) Appl. No.: 14/589,005

(22) Filed: Jan. 5, 2015

(65) Prior Publication Data
US 2015/0196860 A1 Jul. 16, 2015

(30) Foreign Application Priority Data
Jan. 14, 2014 (DE) .......... 10 2014 000 490

(51) Int. Cl.
*B01D 35/153* (2006.01)
*B01D 35/157* (2006.01)

(52) U.S. Cl.
CPC .......... *B01D 35/1573* (2013.01); *B01D 35/153* (2013.01); *B01D 2201/295* (2013.01)

(58) Field of Classification Search
None
See application file for complete search history.

(56) References Cited

U.S. PATENT DOCUMENTS

| 8,916,044 B2* | 12/2014 | Rapin | B01D 35/153 210/232 |
| 2008/0142426 A1* | 6/2008 | Greco | B01D 35/143 210/234 |
| 2013/0081990 A1* | 4/2013 | Roesgen | B01D 35/30 210/232 |

FOREIGN PATENT DOCUMENTS

DE 20 2007 008 483 U1 2/2008

* cited by examiner

*Primary Examiner* — Thomas M Lithgow
(74) *Attorney, Agent, or Firm* — Wenderoth, Lind & Ponack, L.L.P.

(57) ABSTRACT

A filter device has a filter housing (1, 3) releasably accommodating one filter element (15) and has a housing pot (1) surrounding the filter element (15) and a removably attachable housing head (3) with fluid passage (39) for the discharge of filtrate. A valve device in the fluid passage includes a closing body (53) blocking the discharge flow in its closed position and facilitates the discharge flow in its release position. A locking device includes a blocking member (57) locking the closing body (53) in its closed position. The blocking member (57) can move out of its locking position into its unlocking position by a control element (81) on the filter element (15). When the filter element (15) is situated in its functional position in the housing pot (1), the control element impacts the blocking member (57) as the housing head (3) is attached to the housing pot (1) to move the blocking member axially to its unblocking position.

13 Claims, 3 Drawing Sheets

FILTER DEVICE

FIELD OF THE INVENTION

The invention relates to a filter device having a filter housing defining a main axis, in which at least one filter element may be replaceably accommodated. A housing pot surrounds the filter element. A housing head is removably attachable to the housing port, has at least one fluid passage provided for the discharge flow formed in the housing head, and has a valve device associated with the fluid passage. The valve device includes a closing body that, in a closed position, blocks the discharge flow of filtrate and that, in a release position, facilitates the discharge flow. A locking device of the valve device includes a blocking member that, in the locking position, locks the closing body of the valve device in the closed position. The blocking member may be moved out of the locking position into an inoperative unlocking position by a control element provided on the particular filter element. When the filter element is situated in the functional position in the housing pot, the control element mechanically impacts the blocking member when the housing head is attached to the housing pot.

BACKGROUND OF THE INVENTION

Filter devices of this type are widely used for filtration of a wide variety of technical fluids, for example, for hydraulic fluids, cooling lubricants, fuels, lubricating oils and the like. Since operational disruptions or malfunctions of such filter devices may result in the damage to or the destruction of systems downstream, which disruptions or malfunctions may cause economic damage, great importance is attached to the operational reliability of the particular filter device. For this reason, continuous efforts are made in the industry toward improving the operating characteristics and avoiding potential trouble sources. The maintenance work periodically carried out during the operation of the filter devices constitutes a potential trouble source with potentially serious consequences. As well known, filter elements, following certain periods of operation, when sensor devices detect a rise in differential pressure that signals a corresponding contaminant load in the filter element, must be removed as worn and replaced by a new filter element.

To avoid operating errors in connection with a filter element replacement, a filter device of this type is already known from WO 2006/012031 A1, where the device is inoperable if, through an oversight, no filter element is installed in its functional position within the filter housing. The known solution in this case provides a valve device, the closing body of which, in a closed position, blocks the discharge flow of filtrate from the filter housing, and which is fixed in the closed position by a locking device. To release the closing body and, therefore, to unblock the discharge path of the filtrate, the locking device may be moved from the locking position into an inoperative unlocking position. To effect unlocking, a control element is provided on the filter element to be installed in the filter housing, which control element acts to mechanically unblock the locking device during the course of the installation procedure. This arrangement ensures that the discharge flow of filtrate is possible only with a filter element that is installed in the functional position. In the event the device is put into operation when the filter element is inadvertently not installed, the closing body of the valve device remains locked in the closed position, so that the pressure sensor device detects a corresponding rise in pressure to then signal a maintenance error.

The valve device and the locking device in the known solution are provided on a disk extending in a plane in the housing head perpendicular to the main axis. An elevation in the form of a cylindrical sleeve is provided concentrically to the main axis on the upper side of the disk facing away from the housing pot. The upper open end of the elevation forms the flow-through opening for filtrate. The filtrate flows from the inner filtrate chamber of an associated filter element via a connecting piece situated at its end cap.

In the installed functional position of the filter element, the connecting piece extends into the sleeve body. The closing body of the valve device is a round valve plate that, in the closed position, forms, as a valve seat, a seal at the edge of the flow-through opening of the sleeve body when acted upon by a pretension spring, and blocks the exit flow of filtrate.

The locking device, as shown in FIGS. 10 and 15 of WO 2006/012031 A1, includes two blocking members, each in the form of a slide member. The blocking members may be moved in radial directions toward one another and away from one another on the disk by slide tracks arranged diametrically opposite one another on both sides of the sleeve body. Each slide member includes a radially, inward projecting locking part that, in the radially, inwardly slid locking position, overlaps, and thereby locks, the valve plate situated in the closed position. In addition, each slide member includes an actuating part extending below the flow-through opening into the sleeve body that, at its free end, forms a control surface extending diagonally to the main axis. Both slide members are pretensioned by a spring assembly into the locking position close to one another. In order to move the locking device into the unlocking position, i.e., to move the slide members radially apart in the slide tracks, projecting tabs with cam surfaces on the ends thereof are provided as control parts on an axially projecting connecting piece on the end cap of each filter element to be installed. In the functional position, the connecting piece protrudes into the sleeve body of the disk, the angular surfaces of which rest as cam surfaces against the actuating part of the slide members when the tabs in the sleeve body move axially during the course of installation. The cam surfaces on the tabs push the control surfaces on the actuating part of the slide members radially outward to disengage the locking parts of the slide members from the valve plate.

The known solution has definite disadvantages. When converting the axial movement to the radial movements of the slide members occurring against the spring force, as these take place as a result of the interaction of the cam surface on the end cap of the filter element with the control surfaces of the slide members, high actuating forces are required. These forces result in correspondingly high local surface pressures, making it necessary to construct slide member guides that are complex in design in order to keep the friction forces that result from the lateral forces occurring during the interaction of the cam surfaces with the control surfaces on the slide members within limits. This circumstance also requires minimizing the spring force that pre-tensions the slide members in the locking position. Thus, on the whole, the operational reliability of the valve and locking device of the known solution leaves room for improvement.

A further disadvantage are the sealing problems existing between the slide member guides and the filtrate-guiding sleeve body, because the actuating parts of the slide members extend out of the slide member guides into the sleeve body. Another disadvantage is that the selection of material for relevant functional elements is limited due to the high material stresses. Given the mechanical stress of the tabs functioning as control parts, special materials must be used, such as metals or special high-strength plastics. The same applies to the slide members and slide member guides and to the associated disk in the filter head.

SUMMARY OF THE INVENTION

An object of the invention is to provide an improved filter device that is simple and cost-efficient in design and that is distinguished by high operational reliability.

This object is basically achieved according to the invention in the case of a filter device of the aforementioned type, where the blocking member of the locking device is mounted such that it can be axially displaced along the main axis in the housing head for moving between the locking position and the unlocking position, and can be moved into the unlocking position through contact with the control element of the filter element while the housing head is being attached. In this way, the blocking member may be moved by the control element of the filter element directly into the unlocking position during the axial relative movement taking place on the housing head when the housing head is being attached. The connecting elements in the known solution that convert the axial relative movement into the control movement of the slide members provided as blocking members extending perpendicular thereto are eliminated. In the invention, this results in a significant reduction in the required design complexity. The absence of the lateral forces arising in the known solution due to the redirection of movement, also results in a significant reduction in frictional forces, and therefore, the actuating force that must be applied. The resulting minimal material stress allows cost-effective materials, such as plastic materials, to be used for the functional elements in question.

In advantageous exemplary embodiments, the blocking member is pre-tensioned in the locking position, preferably by a spring assembly. In view of the favorable friction conditions, a pre-tensioning force of relatively low intensity can be selected for a reliable operation, which also minimizes the need for actuating force.

When using filter elements including a cap, at least on one end, the control element is advantageously provided on the end cap situated on the end of the filter element facing the housing head.

In particularly advantageous exemplary embodiments, the control element may include a control part projecting axially. The end of the control part comes into contact with the blocking member as the housing head is being attached, and moves the blocking member from the locking position into the unlocking position.

In this case, the arrangement may be particularly advantageously achieved, in that the end cap with the control element includes a central connecting piece. When the housing head is attached to the housing pot, the central connecting piece establishes a fluid connection from the inner filtrate chamber of the filter element to the valve device via a receiving ring situated on the housing head, which receiving ring surrounds a flow-through opening.

In filter elements having such an end cap forming a connecting piece, the control element of the end cap may include control elements in the form of axially projecting tabs. The tabs are formed by wall sections of the connecting piece spaced apart from one another, reach through associated passages in the receiving ring as the housing head is being attached, and come into contact with the blocking member to move it into the unlocking position. As a result, the connecting piece forming the fluid connection to the housing head simultaneously assumes the control function for the locking device.

In particularly advantageous exemplary embodiments, the projecting tabs of the control element are distributed on the periphery of the connecting piece in a pattern characteristic for the specification of the particular filter element. The passages in the receiving ring are formed in a corresponding pattern. In this way, the device provides not only a safeguard against operational start-up when a filter element is missing, but as an additional advantage, a safeguard as well against operating with a filter element that is unsuitable for the intended purpose. The housing head may be attached and the locking device actuated only if a filter element is present with tabs that project in the proper pattern.

The edge of the flow-through opening of the receiving ring may advantageously form the seat for the closing body of the valve device designed as a round valve plate. The valve plate may be guided such that it can move axially, and is pre-tensioned in the closed position against the receiving ring.

The blocking member mounted in an axially displaceable manner in the filter head may include an annular body having a radially projecting flange section. The flange section lies over the passages in the receiving ring provided for access by the tabs and abuts the receiving ring in the locking position. In this way, the tabs guided into the passages come into direct contact with the annular body when their free ends exit the passages, in order to move the annular body against the pre-tensioning force. At the same time, the annular ring forms the end stop that secures the annular body against the biasing force in the locked position.

In particularly advantageous exemplary embodiments, the annular body of the blocking member interacts with the valve plate via a spring assembly.

In this case, the arrangement may be particularly advantageously achieved, in that the spring assembly includes a number of resilient fingers. The resilient fingers are anchored at one end to the receiving ring in a distributed arrangement on the periphery of the flow-through opening. The free ends of the resilient fingers extend beyond the peripheral area of the valve plate when the blocking member is in the unlocking position. The annular body of the blocking member has a conical control surface on its inner periphery. The conical control surface rests against the resilient fingers when the blocking member is moved into the locking position, and moves the free ends of the fingers radially inwardly into a position overlapping the edge of the valve plate situated in the closed position. A flexible compensating element is thus formed as a result of the resilient fingers, which bridges a corresponding radial intermediate space between the periphery of the valve plate and the inner periphery of the annular body of the actuator. This arrangement eliminates the need for a narrow tolerance of the functional elements of the locking device and valve device.

The invention also includes a filter element provided, in particular, for use in a filter device of the invention.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 3:
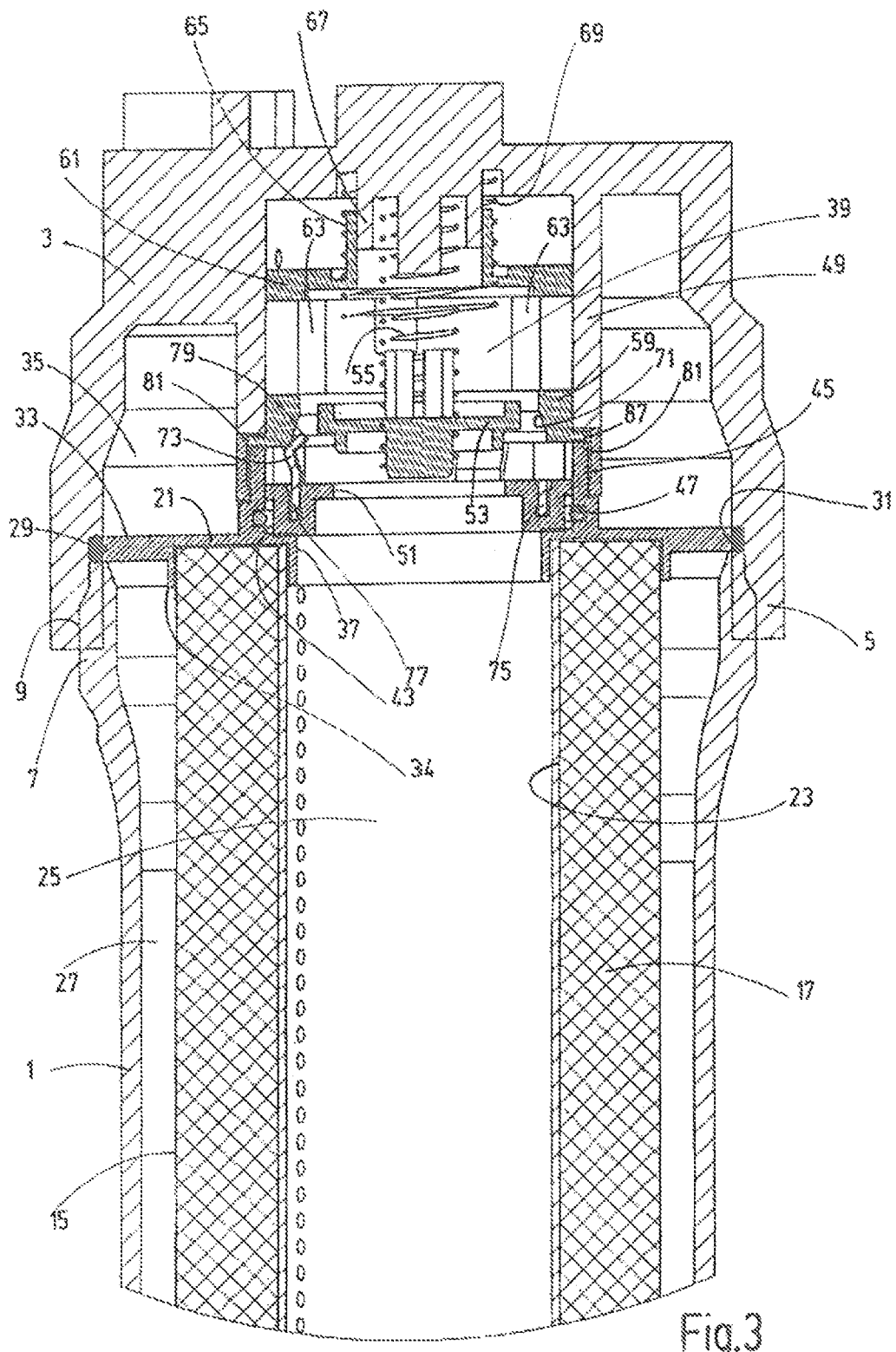
FIG. 3 is an enlarged, partial side view in section of the upper section of the filter device of FIG. 1 with the housing head attached to the housing pot.

The exemplary embodiment depicted in the figures has a largely plain cylindrical filter housing with a housing pot 1 and a housing head 3 removably attached via screw connection to the housing pot 1. In the attached state shown in FIG. 3, the slightly wider-diameter end section 5 of the bell casing of the bell-shaped head 3 overlaps a wall section 7 of the pot 1. The screw connection 9 in FIG. 3 is formed between the end section 5 and wall section 7, the threads of which are not depicted in further detail. The wall section 7 is situated proximate to the upper opening of the housing pot 1 and has the shape of a radial, slightly outwardly drawn thickening of the wall of the pot 1. The pot 1 extends with a thinner wall thickness, starting from wall section 7, cylindrically along the main axis of the device to a curved bottom section 11, which, aside from a normally closed discharge opening 13, seals the pot 1, see FIG. 1.

Within the pot 1, a filter element 15 may be accommodated and includes a filter material 17 forming a hollow cylinder in the manner typical for such filter devices. The filter material has a filter mat, and is preferably multi-layered and/or folded in a pleated manner. In an equally typical manner, one end cap each is situated on each end of the filter material 17. The lower end cap 19 is in FIG. 1, and the upper end cap 21 is situated at the upper end. A fluid-permeable support tube 23 abutting the inner side of the filter material 17 extends between the end caps 19, 21. The end caps 19, 21 and support tube 23 are injection molded from a plastic material as a single piece and surround an inner filter chamber 25. During the filtration process, chamber 25 forms the filtrate chamber on the clean side. The lower end cap 19 is closed and seals the filtrate chamber 25 from the space 27 formed between the outside of the filter material 17 and the inner wall of the pot 1 which space 27, during the filtrate operation, forms the crude or unfiltered side in which the unfiltrate flows to be cleaned.

Figure 2:
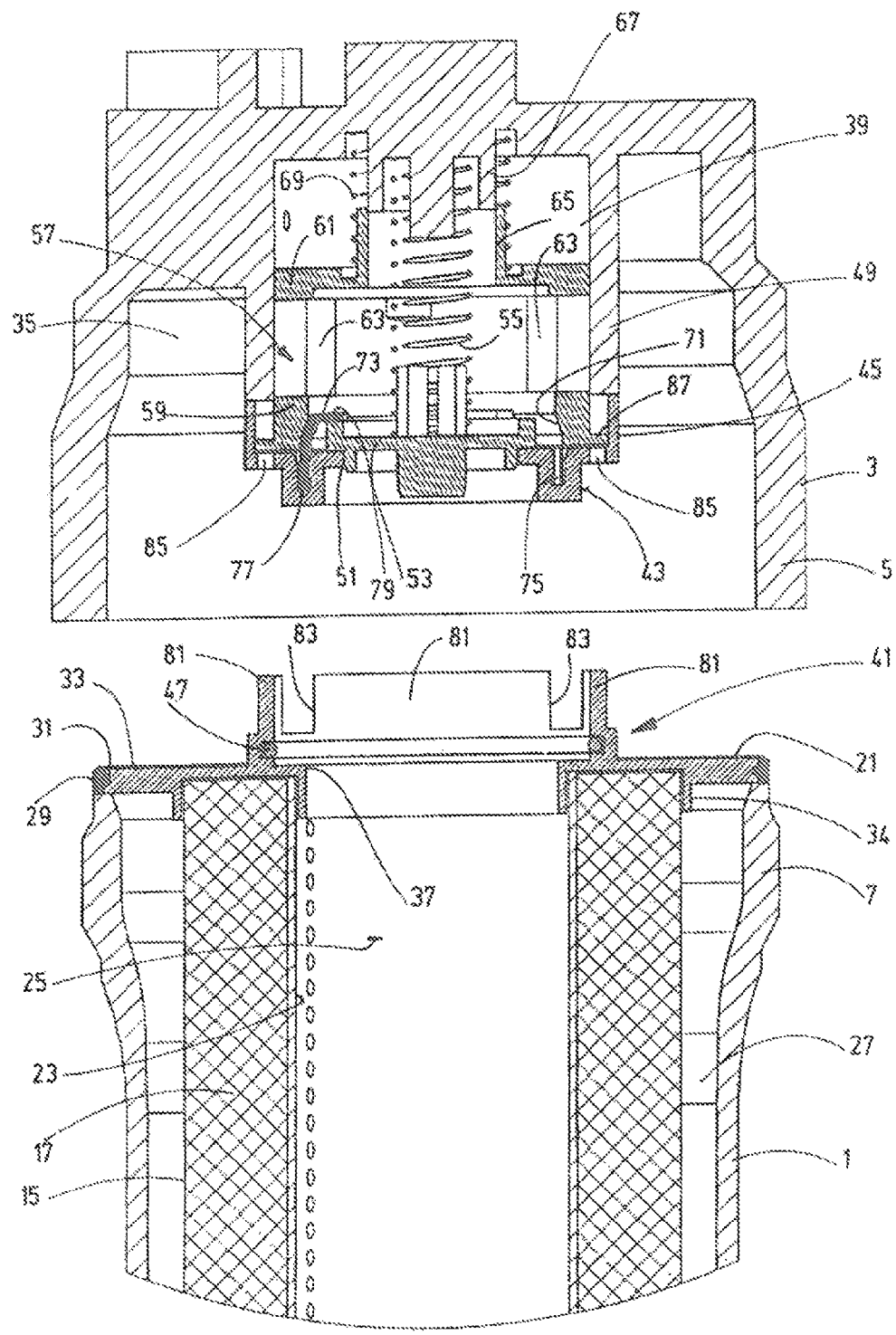
FIG. 2 is an enlarged, partial side view in section of the upper section of FIG. 1.

The upper end cap 21, as is most clearly seen from FIGS. 2 and 3, includes a sealing element in the form of a profile ring 29 for forming an external seal of the filter housing. Ring 29 is seated in a groove-like annular slot 31 (FIG. 2) on the outer periphery of a round, flat disk section 33 of the upper end cap 21. The disk section 33 extending radially outwardly beyond the edge 34 includes openings not visible in the drawing. The openings (see FIG. 3), when the housing 3 is attached to the housing pot 1, form fluid connections between the chamber 27 on the unfiltered side of the pot 1 and an inflow chamber 35 in the housing head 3, to which unfiltrate is able to flow via an inflow connection on the housing head 3, not depicted. The external seal of the chambers 27, 35 guiding this unfiltrate is formed by the profile ring 29 between the end edge of the opening of the pot 1 and the overlapping end section 5 of the housing head 3, see FIG. 3.

The middle section of the flat disk portion 33 of the end cap 21 includes an opening 37 for forming a fluid connection between the inner filter chamber 25 of the filter element 15 and a discharge flow chamber 39 formed in the housing head 3. From chamber 39 the filtrate exits via a discharge flow connection not depicted. To establish this fluid connection, the end cap 21 includes a connecting piece 41 concentrically surrounding the opening 37 and projecting axially out of the flat disk portion 33. As shown in FIG. 3, when the head 3 is attached to the pot 1, and with a filter element 15 present, a fluid port is provided between the connecting piece 41 and a peripheral annular surface 43 of a receiving ring 45 on the head. An O-ring 47 forms the seal on the inner side of the connecting piece 41. The receiving ring 45 forms the end closure of an inner cylinder 49 situated coaxially in the head 3, which inner cylinder delimits the discharge flow chamber 39 and forms a housing for both a valve device serving as a discharge valve and for a locking device.

The receiving ring 45 includes a central flow-through opening 51 that may be sealed by the valve device serving as the discharge valve. The valve device has a closing body in the form of a round valve plate 53. In the closed position shown in FIG. 2, valve plate 53 abuts the edge of the flow-through opening 51 serving as the valve seat. The valve plate 53 is pre-tensioned in and toward the closed position by a closing spring 55. The locking device provided in the invention, with which the valve plate 53 may be locked in the closed position, includes a blocking member 57 formed from an annular body 59 and a guide ring 61 connected via axial guide strips 63. Together, annular body 59 and guide ring 61 may be guided such that they can be displaced axially on the inner side of the inner cylinder 49. The guide ring 61 includes, as an additional guide part, a sleeve part 65 projecting axially toward the upper side of the head and being guided on a guide pin 67 of the head 3 extending coaxially within the discharge chamber 39. Sleeve part 65 and pin 67 are surrounded by a locking spring 69 that biases the blocking member 57 downwardly into its locking position. Spring 69, like the closing spring 55 of the valve plate 53, is formed by a helical-compression spring.

The annular body 59 constitutes the actual functional part of the blocking member 57, and includes for this purpose a control surface 71 on its inner circumference in the form of a conical surface. The control surface 71 expands the inner diameter of the annular body 59 downward, i.e., in the direction toward the receiving ring 45. The control surface 71 is provided for interacting with a spring assembly formed from a ring of resilient fingers 73 that forms the actual locking elements. For the sake of clarity, only one finger 73 is depicted in the drawing, although multiple resilient fingers 73 are arranged next to the edge of the flow-through opening 51 of the receiving ring 45.

One end 75 of the resilient fingers 73 is anchored in slot-like recesses 77 (FIGS. 2 and 3) of the receiving ring 45. The resilient fingers 73 are shaped in such a way that in the unloaded state, as is shown in FIG. 3, the free end 79 thereof is situated outside the peripheral area of the valve plate 53. The unloaded state of the resilient fingers 73 corresponds to the unlocking position of the locking device, i.e., to the state, in which the valve plate 53 may be raised to enable the discharge of filtrate from the valve seat at the opening 59 of the receiving ring 45. A prerequisite for this unloaded state of the resilient fingers 73, corresponding to the unlocking position, is that the annular body 59 of the blocking member 57 has moved from the position shown in FIGS. 1 and 2 axially upward against the action of the locking spring 69 in the figures.

This state can only be achieved if, in the case of a filter element 15 situated in the functional position in the housing pot 1, the housing head 3 is attached and, as a result, a control element situated on the end cap 21 of the filter element 15 guides the blocking member 57 into the unlocking position. The control parts of the control element provided for this purpose are tabs 81 projecting axially on the connecting piece 41. Tabs 81 are formed on the connecting piece 41 distributed in a pattern with gaps 83 situated between them. Suitable passages 85 are formed in the receiving ring 45 of the head 3, into which the tabs 81 enter when the housing head 3 is attached to the pot 1. The annular body 59 of the blocking member 57 includes a radially projecting flange section 87. Flange section 87 extends over the passages 85 of the receiving ring 45 such that the ends of the tabs 81 come into contact with the flange section 87, to then shift the blocking member 57 against the force of the locking spring 69 into the unlocking position as the head 3 is attached.

Figure 1:
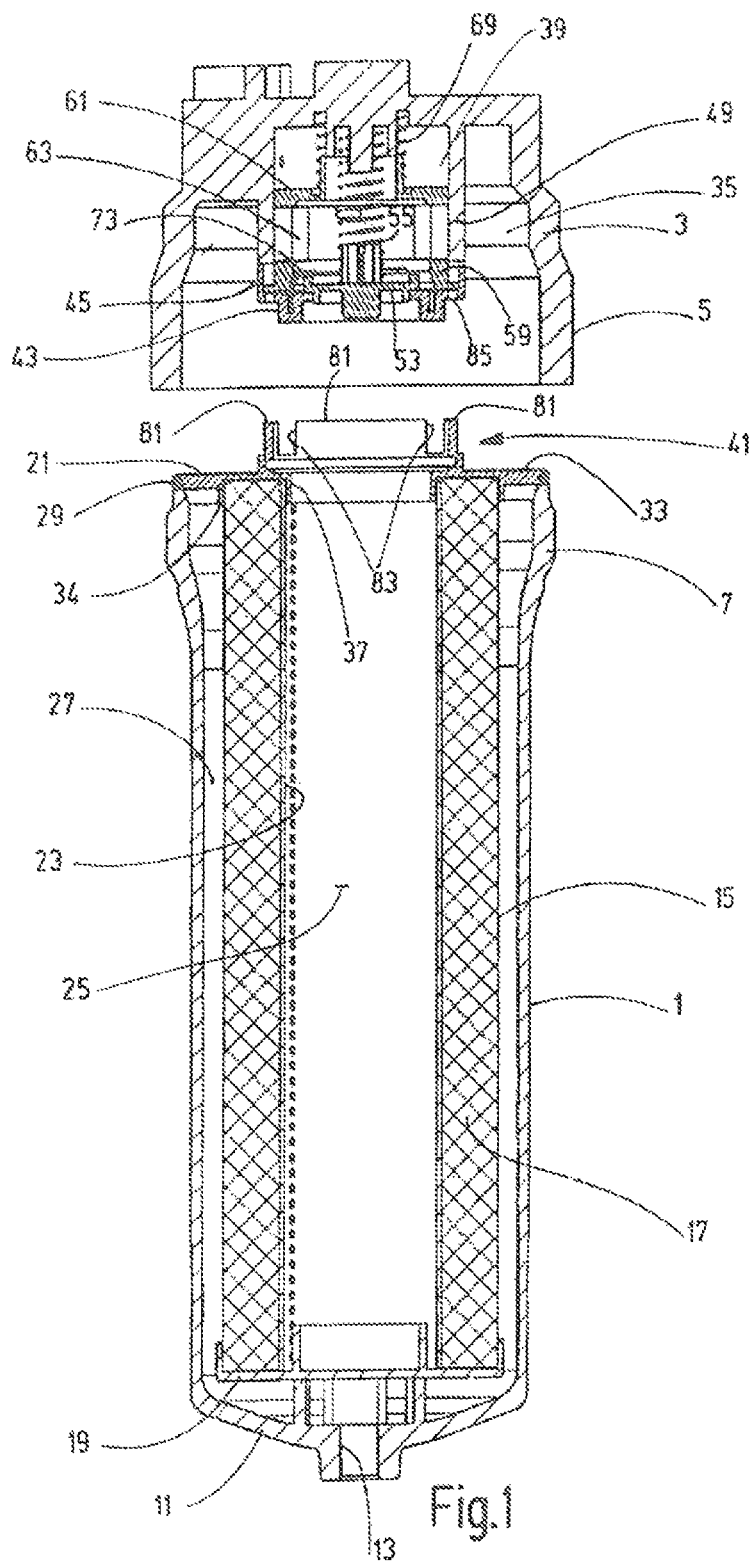
FIG. 1 is a side view in section of a filter device according to an exemplary embodiment of the invention, depicted with the housing head removed from the filter housing.

FIGS. 1 and 2 show the state in which the tabs 81 serving as control elements do not encroach in the passages 85 of the receiving ring 45. The blocking member 57, under the influence of the locking spring 60, is situated in the downward displaced locking position, in which the control surface 71 of the annular body 69 impinges the resilient fingers 73 in the area of the free ends 79 thereof. As shown in FIGS. 1 and 2, control surface 71 moves free ends 79 over the peripheral edge of the valve plate 53. In this operating state, the valve plate 53 is situated in the locking position under the impact of the locking spring 55, in which it remains locked as long as the annular body 59 is situated in the locking position.

When the housing head 3 is attached to the housing pot 1, without a filter element 15 situated in the functional position, the valve plate 53 remains locked in the locking position, so that the discharge valve is closed. An erroneous operational start-up would result in generating a pressure signal as an error alarm. During a proper operational start-up, the tabs 81 of the end cap 21 come into contact with the flange section 87 of the annular body and move the blocking member 57 into the unlocking position. Once the control surface 71 on the annular body 59 releases the ends 79 of the resilient fingers 73, the resilient fingers 73 spring into the position shown in FIG. 3, thereby neutralizing the locking of the valve plate 53. As a result, the operating fluid pressure raises the valve plate 53 from the valve seat at the flow-through opening 51, thereby allowing the filtrate to be discharged.

If, for carrying out a filter element replacement, the filter device is taken out of operation, the valve plate 53 returns to the locking position when the operating fluid pressure drops. Upon removal of the housing head 3, the tabs 81 exiting the passages 85 of the receiving ring 45 release the blocking member 57, so that the blocking member 57, under the influence of the locking spring 69, returns to the locking position, in which the control surface 71 of the annular body 59 shifts the resilient fingers 73 onto the valve plate 53 and locks the discharge valve in the locking position.

The functional parts interacting with the locking device, valve device and control element on the filter element 15 may be cost-effectively manufactured as plastic parts by injection molding. Due to the minimal actuation forces that form for the immediate actuation by axial movement of the movable parts provided by the invention, cost-effective materials can be utilized. In addition, by varying the physical design of the control element on the filter element 15, and in addition, the complementary design of the passages 85 in the receiving ring, it may be ensured that the device can only be started up using the proper filter element in each case.

While one embodiment has been chosen to illustrate the invention, it will be understood by those skilled in the art that various changes and modifications can be made therein without departing from the scope of the invention as defined in the claims.

The invention claimed is:

1. A filter device comprising:
a filter housing defining a main axis and having a housing pot and housing head removably attachable to said housing pot, said housing head having a fluid passage for filtrate discharge flow;
at least one filter element releasably accommodated in said filter housing and surrounded by said housing pot;
a control element on said filter element;
a valve device connected to said housing head and having a closing body blocking the filtrate discharge flow in said fluid passage in a closed position thereof and facilitating the filtrate discharge flow through said fluid passage in a release position thereof; and
a locking device in said housing head including a blocking member locking said closing body in the closed position thereof in a locking position of said blocking member, said blocking member being movable from the locking position thereof into an inoperative unlocking position thereof allowing said closing body to move to the release position thereof by said control element on said filter element mechanically impacting and contacting said blocking member when said filter element is in a functional position thereof in said housing pot as said housing head is being attached to and moved axially along said main axis relative to said housing pot, said blocking member being mounted in said housing head for axial movement along said main axis between the locking position thereof and the unlocking position thereof.

2. A filter device according to claim 1 wherein said blocking member is biased toward the locking position by a spring.

3. A filter device according to claim 1 wherein said filter element comprises an end cap on at least one end thereof, said control element being on said end cap.

4. A filter device according to claim 1 wherein said control element comprises at least one axially projecting control part having an end thereof contacting said blocking member as said housing head is being attached to said housing pot and moving said blocking member into the unlocking position thereof.

5. A filter device according to claim 3 wherein said end cap comprises a central connecting piece establishing a fluid connection from an inner filtrate chamber of said filter element to said valve device via a receiving ring on said housing head surrounding a flow-through opening when said housing head is attached to said housing pot.

6. A filter device according to claim 5 wherein said control element comprises axially projecting tabs extending parallel to said main axis, being formed by wall sections of said central connecting piece and being spaced from one another, said tabs extending through respective passages in said receiving ring and contacting said blocking member to move said blocking member into the unlocking position thereof as said housing head is attached to said housing pot.

7. A filter device according to claim 6 wherein said projecting tabs are distributed on a periphery of said connecting piece in a pattern characteristic of specifications of said filter element; and
said passages are formed in said receiving ring in a pattern corresponding to said pattern of said projecting tabs.

8. A filter device according to claim 5 wherein an edge of said flow-through opening of said receiving ring forms a seat engaged by said closing body of said valve device in the closed position thereof, said closing body comprising a round valve plate.

9. A filter device according to claim 8 wherein said valve plate is guided for axial movement along said main axis and is pretensioned toward the closed position of said closing body against said receiving ring.

10. A filter device according to claim 5 wherein
said blocking member comprises an annular body having a radially projecting flange section extending over passages in said receiving ring and abutting said receiving ring in the locking position of said blocking member.

11. A filter device according to claim 10 wherein
an edge of said flow-through opening of said receiving ring forms a seat engaged by said closing body of said valve device in the closed position thereof, said closing body comprising a round valve plate; and
said annular body of said blocking member interacts with said valve plate via a spring assembly.

12. A filter device according to claim 11 wherein
said spring assembly comprises plural resilient fingers, each of said fingers having a mounting end anchored to said receiving ring and distributed on a periphery of said flow-through opening and having a free end extending beyond a peripheral area of said valve plate when said blocking member is in the unlocking position thereof; and
said annular body comprises a conical control surface on an inner periphery thereof, contacts said fingers when said blocking member is moved into the locking position thereof and moves each said free end of said fingers radially inwardly toward said main axis into a position overlapping an edge of said valve plate in the closed position of said closing body.

13. A filter device according to claim 1 wherein
said blocking member being mounted in said housing head only for axial movement along said main axis between the locking position thereof and the unlocking position thereof.

\* \* \* \* \*